Patented Jan. 12, 1926.

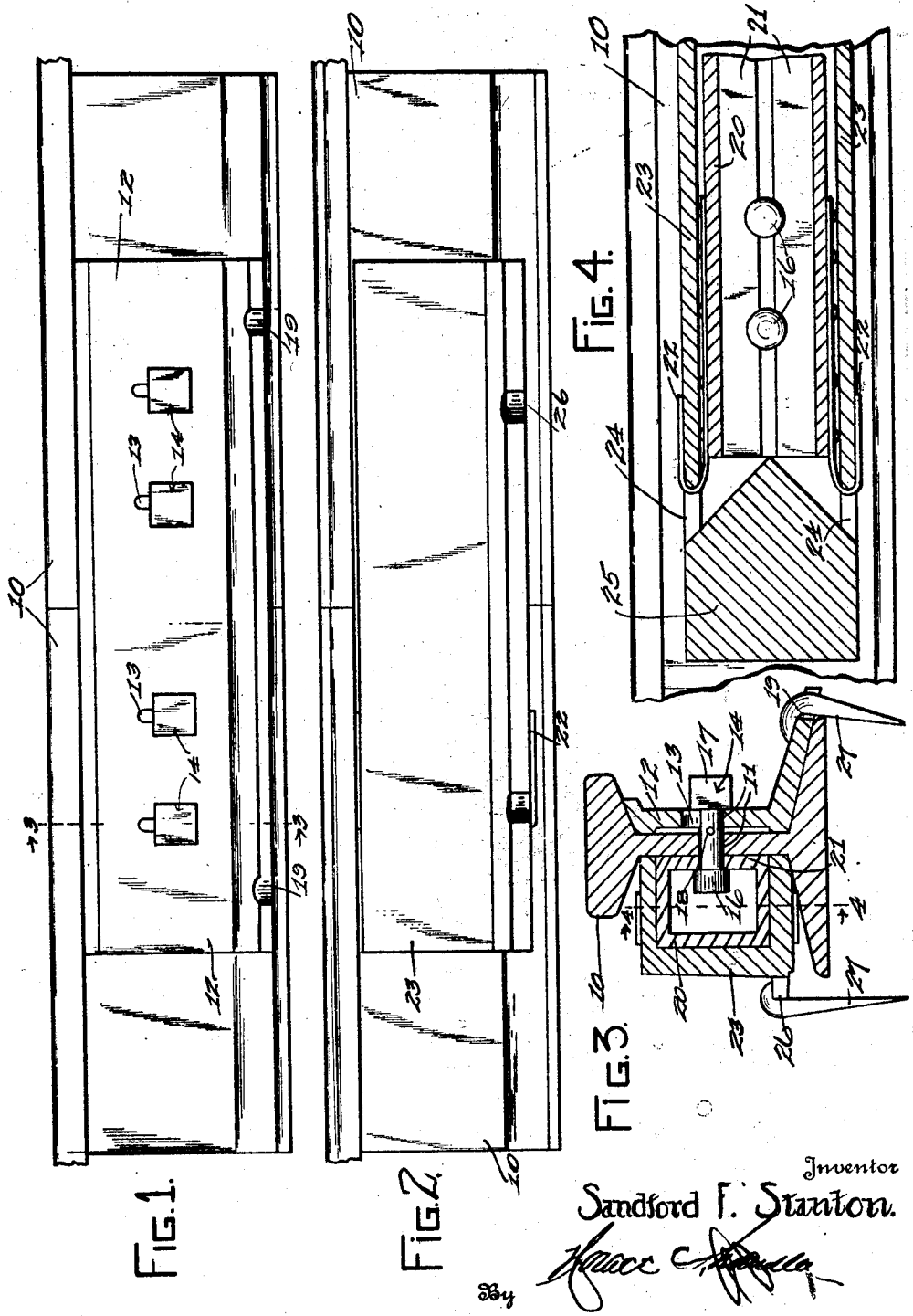

1,569,047

UNITED STATES PATENT OFFICE.

SANDFORD FELIX STANTON, OF LOCKLAND, OHIO.

RAIL JOINT.

Application filed February 4, 1925. Serial No. 6,738.

*To all whom it may concern:*

Be it known that I, SANDFORD F. STANTON, a citizen of the United States, residing at Lockland, in the county of Hamilton, State of Ohio, have invented certain new and useful Improvements in Rail Joints; and I do hereby declare the following to be a full, clear, and exact description of the invention, such as will enable others skilled in the art to which it appertains to make and use the same.

This invention relates to new and useful improvements in railway rail joints, and particularly to devices for holding the meeting ends of rails together.

One object of the invention is to provide a joint wherein the use of nuts is obviated, while at the same time allowance is permitted for the expansion and contraction of the rails.

One object of the invention is to provide a locking device for engagement with the bolt ends of the joint, whereby to prevent withdrawal movement thereof through the rails and splice bar.

Another object is to provide novel means for locking the bolts in engagement with the splice bar.

Other objects and advantages will be apparent from the following description when taken in connection with the accompanying drawings.

In the drawings:

Figure 1 is a side elevation of a rail joint made in accordance with the present invention.

Figure 2 is an elevation view from the opposite side of the joint.

Figure 3 is a vertical transverse sectional view on the line 3—3 of Figure 1.

Figure 4 is a vertical longitudinal sectional view on the line 4—4 of Figure 3.

Referring particularly to the accompanying drawings, 10 represents a pair of meeting rail ends, each of which is provided with the bolt openings 11, of the usual form. Against one side of the webs of the rails is disposed the splice bar 12, having the series of keyhole openings 13 therein for the reception of the bolts 14. Each of the bolts has a shank, and the round head 16, and angular head 17. The round head of the bolt is passed through the splice bar and then through an opening in the rail web, said bolt having a radially extending pin 18, in its shank, adjacent the angular head 17, which passes through the radial portion of the keyhole opening 13, said pin being arranged to be seated behind the splice bar, upon partial rotation of the bolt, whereby to prevent the bolt being withdrawn. The splice bar is provided with spike receiving notches 19, in its lower outer edge. The other ends of the bolts project to proper distances beyond the other face of the rail web, as seen in the sectional view Figure 3. A channel member 20, having the inturned flanges 21, is slipped longitudinally of the rail ends, so as to engage the round heads of the bolts therewithin, and inwardly of the said flanges. Carried by one end of the channel member 20, at the sides thereof, are the longitudinally extending, bendable metal arms 22, the other end of the channel member being closed whereby to limit the movement of the member in one direction. A second channel member 23 is slipped longitudinally on the channel member 20, and is provided with openings 24 in the opposite sides of one end thereof, through which the said arms 22 are arranged to pass, said arms being arranged to be bent back against the outer face of the channel member 23, whereby to hold the channel members against relative sliding movement, and disengagement from the bolt heads. To properly guide the arms 22 outwardly through the openings 24 there is mounted a V-shaped block 25, in the end of the channel member 23, adjacent said openings, and against the inclined sides of which said arms engage, as the channel member 23 is slipped onto the channel member 20. The lower portion of the channel member 23 is provided with a flange 26 which extends a short distance beyond the base flange of the rail, where it is provided with notches for receiving the securing spikes 27.

What is claimed is:

1. The combination with the meeting ends of rails, of bolts disposed through the rails and having heads on both ends, a channel member slidably engaged on the heads of the bolts at one side of the rails, and means slidably engaged on the channel member in covering relation with respect thereto to prevent movement of the latter.

2. The combination with the meeting ends of rails, of bolts disposed through the rails and having heads on both ends, a channel member slidably engaged on the heads of the bolts at one side of the rails, bendable means on the channel member, and a second channel member engaged on the first channel member and having openings receiving said bendable means therethrough.

3. The combination with the meeting ends of rails, of bolts disposed through the rails and having heads thereon, a channel member disposed in receiving engagement with said heads, longitudinal bendable arms on one end of the channel member, a second channel member engaged in enclosing relation to the first channel member and having lateral openings through which the said arms are arranged to pass, said arms being arranged to be bent onto the second channel member, and a guiding means in the second channel member for guiding the said arms through said openings.

In testimony whereof, I affix my signature.

SANDFORD FELIX STANTON.